United States Patent
Hinderhofer et al.

(10) Patent No.: US 11,390,378 B2
(45) Date of Patent: Jul. 19, 2022

(54) ACTUATOR IN A LANDING GEAR SYSTEM OF AN AIRCRAFT

(71) Applicant: Liebherr-Aerospace Lindenberg GmbH, Lindenberg/Allgäu (DE)

(72) Inventors: Manfred Hinderhofer, Scheidegg (DE); Christian Schilling, Malerhöfen (DE)

(73) Assignee: Liebherr-Aerospace Lindenberg GmbH, Lindenberg/Allgäu (DE)

( * ) Notice: Subject to any disclaimer, the term of this patent is extended or adjusted under 35 U.S.C. 154(b) by 728 days.

(21) Appl. No.: 15/850,656

(22) Filed: Dec. 21, 2017

(65) Prior Publication Data

US 2018/0208299 A1    Jul. 26, 2018

(30) Foreign Application Priority Data

Dec. 22, 2016    (DE) ...................... 10 2016 015 383.0

(51) Int. Cl.
| | |
|---|---|
| *H02P 1/30* | (2006.01) |
| *H02P 1/58* | (2006.01) |
| *H02P 27/08* | (2006.01) |
| *B64C 25/24* | (2006.01) |
| *B64C 25/42* | (2006.01) |
| *B64C 25/30* | (2006.01) |
| *B64C 25/22* | (2006.01) |
| *B64C 13/24* | (2006.01) |
| *B64C 25/18* | (2006.01) |

(52) U.S. Cl.
CPC .............. *B64C 25/24* (2013.01); *B64C 13/24* (2013.01); *B64C 25/18* (2013.01); *B64C 25/22* (2013.01); *B64C 25/30* (2013.01); *B64C 25/42* (2013.01)

(58) Field of Classification Search
CPC ................................. H02P 25/03; H02P 5/505
See application file for complete search history.

(56) References Cited

U.S. PATENT DOCUMENTS

| 6,296,325 B1 | 10/2001 | Corio et al. | |
|---|---|---|---|
| 2007/0070667 A1* | 3/2007 | Stancu | H02M 7/493 363/132 |
| 2010/0170983 A1* | 7/2010 | Fervel | B64C 13/504 244/99.2 |
| 2012/0013284 A1* | 1/2012 | Campbell | H02H 7/08 318/490 |
| 2014/0027580 A1* | 1/2014 | Christmann | B64C 3/50 244/213 |

(Continued)

FOREIGN PATENT DOCUMENTS

| DE | 102010016374 A1 | 10/2010 |
|---|---|---|
| DE | 102012022288 A1 | 5/2014 |

(Continued)

*Primary Examiner* — Muhammad S Islam
*Assistant Examiner* — Charles S Laughlin
(74) *Attorney, Agent, or Firm* — Dilworth & Barrese, LLP

(57) ABSTRACT

The present invention relates to an actuator in a landing gear system of an aircraft, comprising: an electric drive for driving the actuator and first drive electronics for controlling the electric drive that are connected to the drive via an electric line, with second drive electronics for controlling the electric drive that are connected to the drive via an electric line, with the first drive electronics and the second drive electronics being redundant with respect to one another.

17 Claims, 5 Drawing Sheets

(56) References Cited

U.S. PATENT DOCUMENTS

2015/0291279 A1* 10/2015 Iordanidis ............... B64C 25/46
                                                            188/156
2016/0339881 A1* 11/2016 Abbott ................... B64C 25/44

FOREIGN PATENT DOCUMENTS

EP          1484244  A1    12/2004
EP          3095692  A1    11/2016

* cited by examiner

ACTUATOR IN A LANDING GEAR SYSTEM OF AN AIRCRAFT

BACKGROUND OF THE INVENTION

The present invention relates to an actuator in a landing gear system of an aircraft.

Actuators are widely used in landing gear systems of an airplane or of a helicopter. The demands in commercial operation of airplane systems and helicopter systems are increasing to reduce the failure quotas or to reduce aborted flights due to a failure of an actuator. At the same time, there is a trend toward electrohydraulic actuators (EHAs) and electromechanical actuators (EMAs) replacing the classical central hydraulic system previously used in aircraft. The reason for this is the improved efficiency that can be achieved through EHA and EMA technologies.

Classical systems with a central hydraulic supply such as are shown, for example, in FIG. 1, use partial redundancy for the control of landing gear, the landing gear actuation (the extension and retraction of the landing gear) and the braking. This means that not all components that contribute to the actuation of the actuator are designed as redundant, but rather only some of these components are designed as redundant. As already mentioned above, systems that make use of a central hydraulic supply are, however, no longer up-to-date and are used less and less due to their small efficiency with respect to electromechanical actuators and electrohydraulic actuators.

There are, however, also endeavors in the prior art to further reduce the failure probability of electrohydraulic and electromechanical actuators. FIG. 2 in this respect shows an approach in which a complete redundancy of the decentralized pressure generation for landing gear actuation is shown. In such an electrohydraulic actuator, two motor pump units are present each having independent drive electronics. However, this concept brings along the disadvantage of an increased weight and higher costs. In addition, the nominal performance of the actuator with an actuator shown in FIG. 2 is only reached with a parallel operation of the two redundant pressure generator units. Accordingly, if one of the redundantly set up motor pump units fails, the performance of the actuator changes significantly.

SUMMARY OF THE INVENTION

It is the aim of the present invention to overcome the above-listed problems and to provide an actuator that combines an extremely low failure probability at costs and a weight that are as small as possible.

This is done using an actuator that has all the features herein.

The actuator in a landing gear system of an aircraft accordingly comprises an electric drive for driving the actuator and first drive electronics for controlling the electric drive that are connected via an electric line to the drive. The actuator is characterized in that it furthermore has two drive electronics for controlling the electric drive that are connected to the drive via an electric line, with the first drive electronics and the second drive electronics being redundant with respect to one another.

The actuator in accordance with the invention accordingly has one electronic drive, but two drive electronics that are connected to the electric drive and that are redundant with respect to one another. The availability increase (reduction of the failure probability) that is aimed for is accordingly achieved by a partial redundancy that is just limited to the electronics or electrics. Since, as experience shows, the electronics have a higher failure probability than the mechanical components, only the electric portion of the actuator is provided as redundant. The redundancy is accordingly restricted to the elements having the highest failure rate.

In accordance with an optional modification of the present invention, the actuator is an electromechanical actuator or an electrohydraulic actuator, with the electric drive preferably being a pump of a hydraulic circuit with an electrohydraulic actuator.

In accordance with a preferred variant of the invention, the first drive electronics differ from the second drive electronics. However, the case is also covered by the invention according to which the first drive electronics are identical to the second drive electronics.

The advantage that results when the first drive electronics differ from the second drive electronics can be found in the independence of the redundantly designed elements required at times by the authorities. If the reason for a failure of the actuator is, for example, due to the logical conception of the drive electronics, a redundant similar design does not provide any remedy here so that no independent second possibility would be available.

Provision is preferably made that the actuator only has the one electric drive. This is an expression of the partial redundancy. Provision can also be made that the actuator has a decentralized hydraulic circuit, that is, is not connected to a central hydraulic system of an aircraft.

In accordance with a further optional modification of the invention, the electric drive is an electric motor that is connected both to the first drive electronics and to the second drive electronics, with the first drive electronics and the second drive electronics preferably being connected to one another via a communications link.

If the electric drive is an electric motor, the electric motor can be designed as a dual winding motor, with the dual windings being independent of one another. Provision can additionally be made that one of the dual windings cooperates with the first drive electronics and the other one of the dual windings cooperates with the second drive electronics.

Due to the presence of the dual windings in the motor, the motor can be controlled by each of the two drive electronics without having to share control electronics for the motor.

Provision can be made here that the dual winding is present on a common shaft and/or on the same rotor magnets. It is also possible alternatively to this that the dual winding is arranged on a stator of the electric motor.

In accordance with a further development of the invention, the electric motor has redundantly implemented phases, with one of the redundant phases cooperating with the first drive electronics and the other one of the redundant phases cooperating with the second drive electronics.

In accordance with a preferred embodiment of the invention, the actuator further comprises a switchover unit that permits a control of the motor either by the first drive electronics or by the second drive electronics. Provision can be made in this respect that the switchover unit is switched on a failure of one of the two drive electronics such that it does not forward any control commands of the failed failure electronics to the motor, but rather only passes on the commands of the non-failed drive electronics.

In accordance with an advantageous modification of the invention, the electric motor is a 3-phase permanent synchronous motor that is preferably provided with a resolver or with a Hall effect sensor for the motor regulation.

In accordance with a further development of the invention, provision can be made that the actuator is furthermore provided with a first motor sensor for determining an operating state of the drive and with a second motor sensor for determining an operating state of the drive, with the first motor sensor being electrically connected to the first drive electronics and the second motor sensor being electrically connected to the second drive electronics. It is thereby ensured that each drive electronic system receives separately sensed values and, in the event of incorrect output values of one of the two sensors, both drive electronics do not output incorrect control commands.

The actuator is preferably designed to actuate landing gear or to control a landing gear wheel. The actuation of the landing gear is understood as the retraction or extension of the landing gear as well as the locking in the retracted and extended state.

Provision can be made in accordance with a further variant of the invention that the performance of the actuator or of the electric drive is independent of the failure of one of the two mutually redundant drive electronics. This is of advantage since the response behavior of the actuator is also no different on failed drive electronics of the drive electronics.

However, the case is also covered by the invention, wherein the performance of the actuator or of the electric drive reduces on the failure of one of the two mutually redundant drive electronics; the performance preferably reduces by half here. It may be of advantage under certain circumstances if the performance of the actuator is reduced on a failure of one drive electronic system. In emergency operation, the generation of power peaks is thus then prevented so that the load of a voltage network is kept low during an emergency supply. It must be noted here that even with the reduced performance, the primary task of the actuator is satisfied; it only takes longer or the design of the actuator is more wear-intensive.

The invention additionally relates to a landing gear system of an aircraft that comprises a plurality of actuators in accordance with one of the preceding claims, wherein the first drive electronics and the second drive electronics for the plurality of actuators of the landing gear system are arranged centrally together at one location. On a failure of a drive electronics systems, the repair of the failed drive electronics is thereby simplified since access to the actuators arranged in part at locations with difficult access is not required.

BRIEF DESCRIPTION OF THE DRAWINGS

Further details, features and advantages of the invention will be explained with reference to the following description of the Figures. There are shown.

DESCRIPTION OF THE PREFERRED EMBODIMENTS

Figure 1:
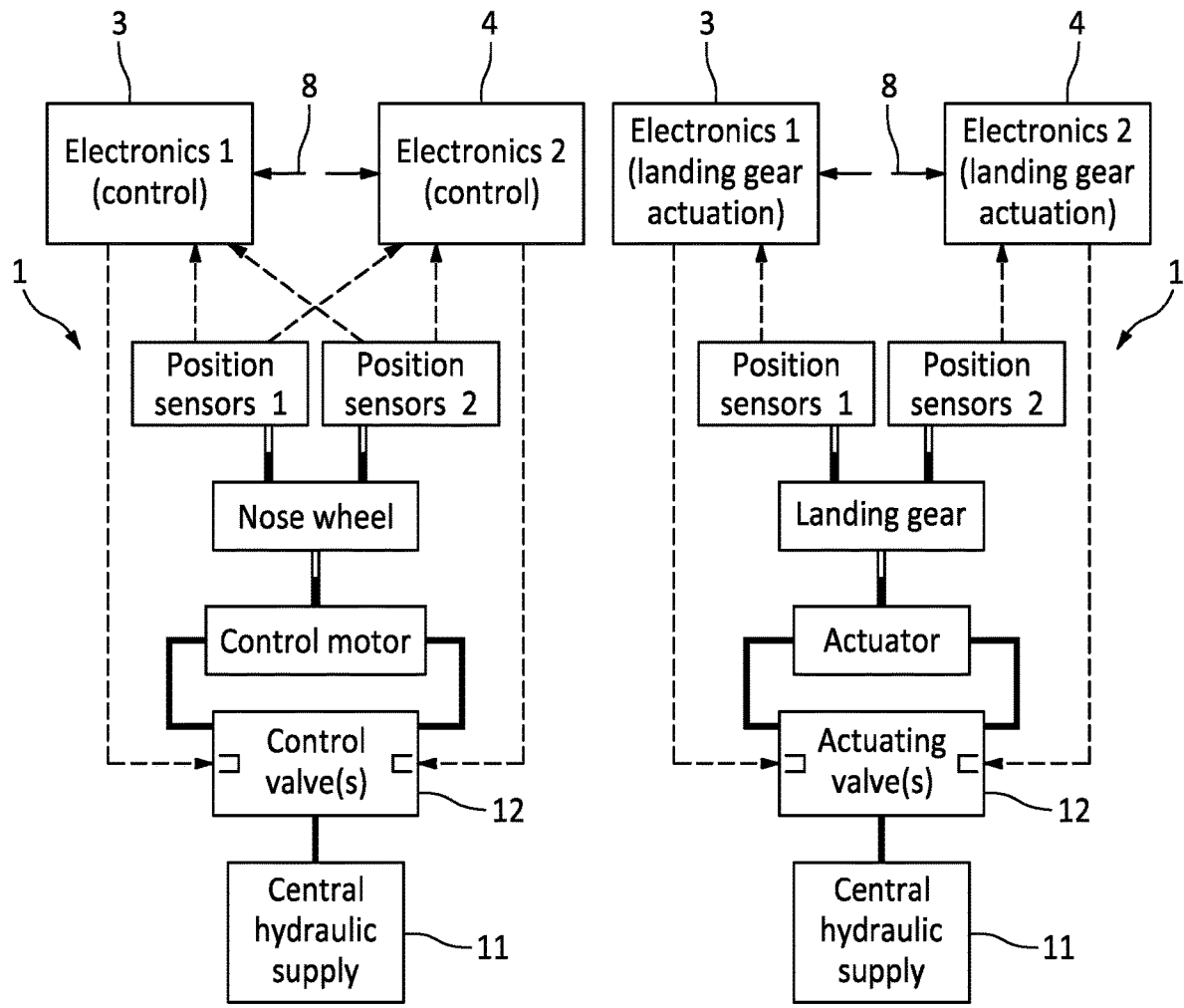
FIG. 1: classical actuator systems with a central hydraulic supply from the prior art.

FIG. 1 illustrates the prior art and shows two different actuators, with left one thereof serving the control of a nose wheel and the right one serving the actuation of landing gear. The individual actuators 1 are here linked via a central hydraulic supply 11. The corresponding motor for controlling the nose wheel or for actuating the landing gear is driven by the opening or regulating of valves. The redundant design of position sensors and of the associated electronics generates two signals that differ from one another and that are conducted to the valves 12.

Figure 2:
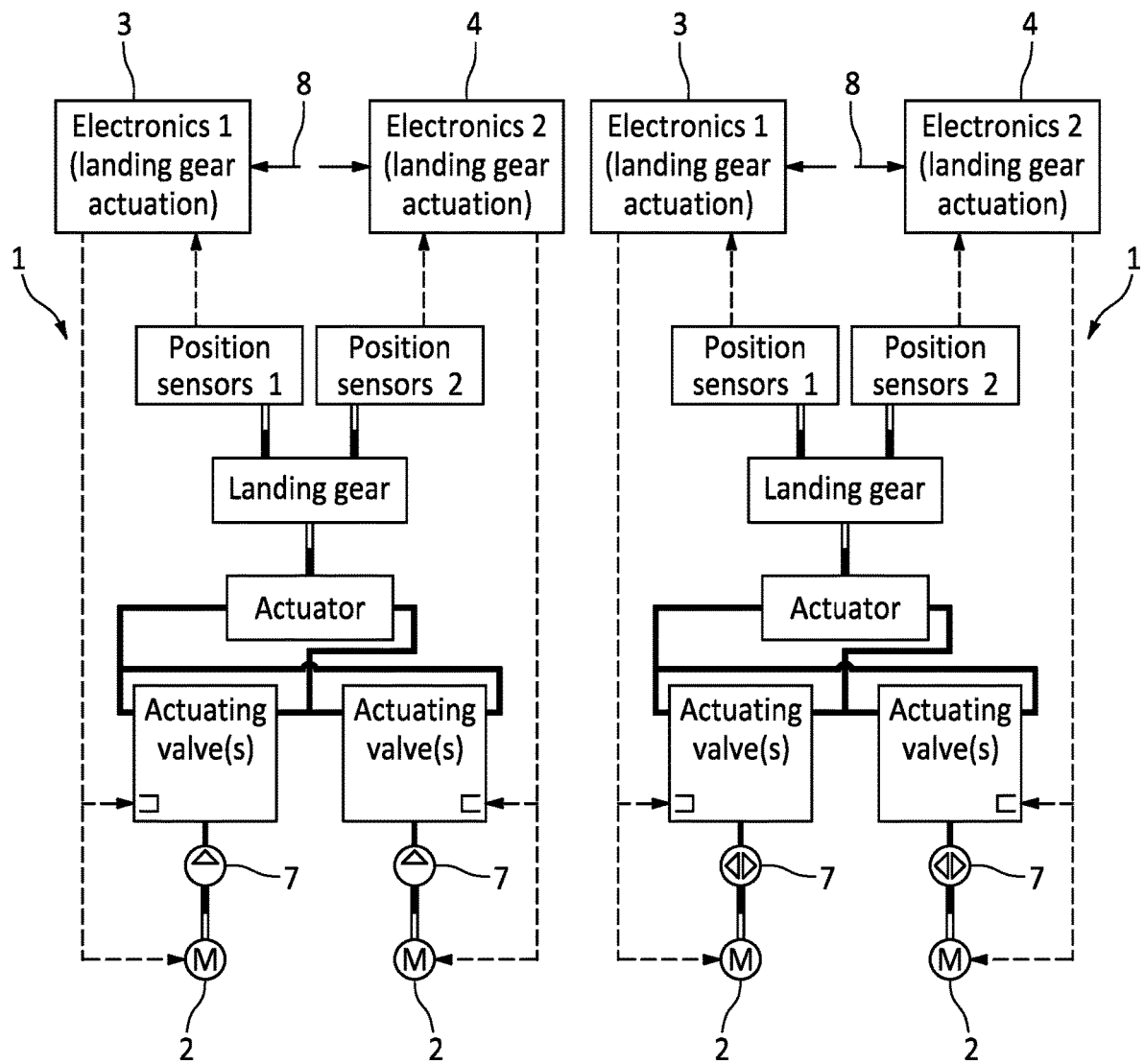
FIG. 2: electrohydraulic actuators with complete redundancy of a decentralized pressure generation from the prior art.

FIG. 2 shows further prior art that manages without any central hydraulic supply. An electromechanical actuator 1 is shown in this Figure whose means for the pressure generation of the hydraulic fluid is designed as fully redundant. It can be recognized that the actuator 1 has two motors 2 and two pumps 7. The use of complete redundancies, however, produces an increase in costs and a higher weight.

Figure 3:
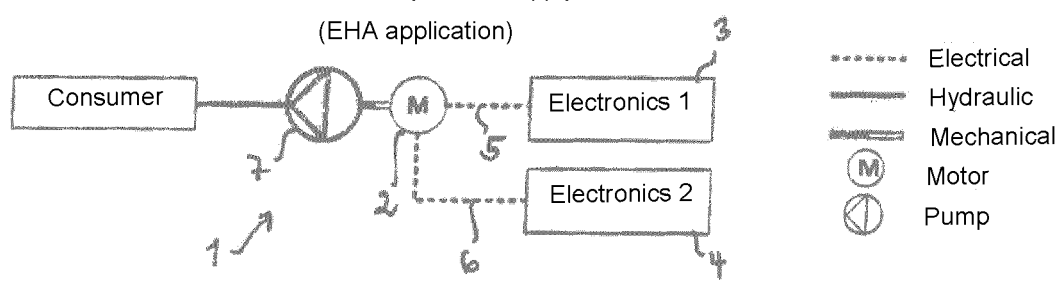
FIG. 3: a schematic representation of the present invention with reference to an electrohydraulic actuator.

FIG. 3 shows a schematic representation of an actuator in accordance with the invention. This Figure here shows an electrohydraulic actuator with a decentralized hydraulic supply. The central hydraulic supply of the consumer, that is of an element to be adjusted, is here generated by the motor 2 in conjunction with the pump 7 connected to the motor via a mechanical coupling. First drive electronics 1 can furthermore be recognized that are connected to the motor via a first electronic line 5. Besides, there are second drive electronics 4 that are likewise connected to the drive 2 via an electric line 6. Due to the provision of the partial redundancy in which only the drive electronics are designed as completely redundant and the motor is only present in a single design, it is possible to reduce a failure probability without increasing the weight and the costs as in the solution shown in FIG. 2. The electric motor 2 is redundantly controllable here.

Figure 4:
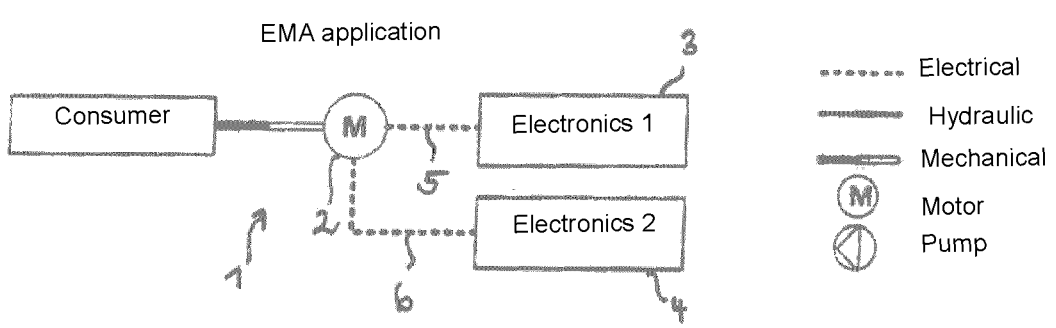
FIG. 4: a schematic representation of the present invention with reference to an electromechanical actuator.

FIG. 4 shows an actuator in accordance with the invention, namely an electromechanical actuator 1. The consumer here is directly connected to the electric motor 2 via a mechanical coupling. The redundant drive electronics 3, 4 do not substantially differ from the drive electronics of FIG. 3 here.

Figure 5:
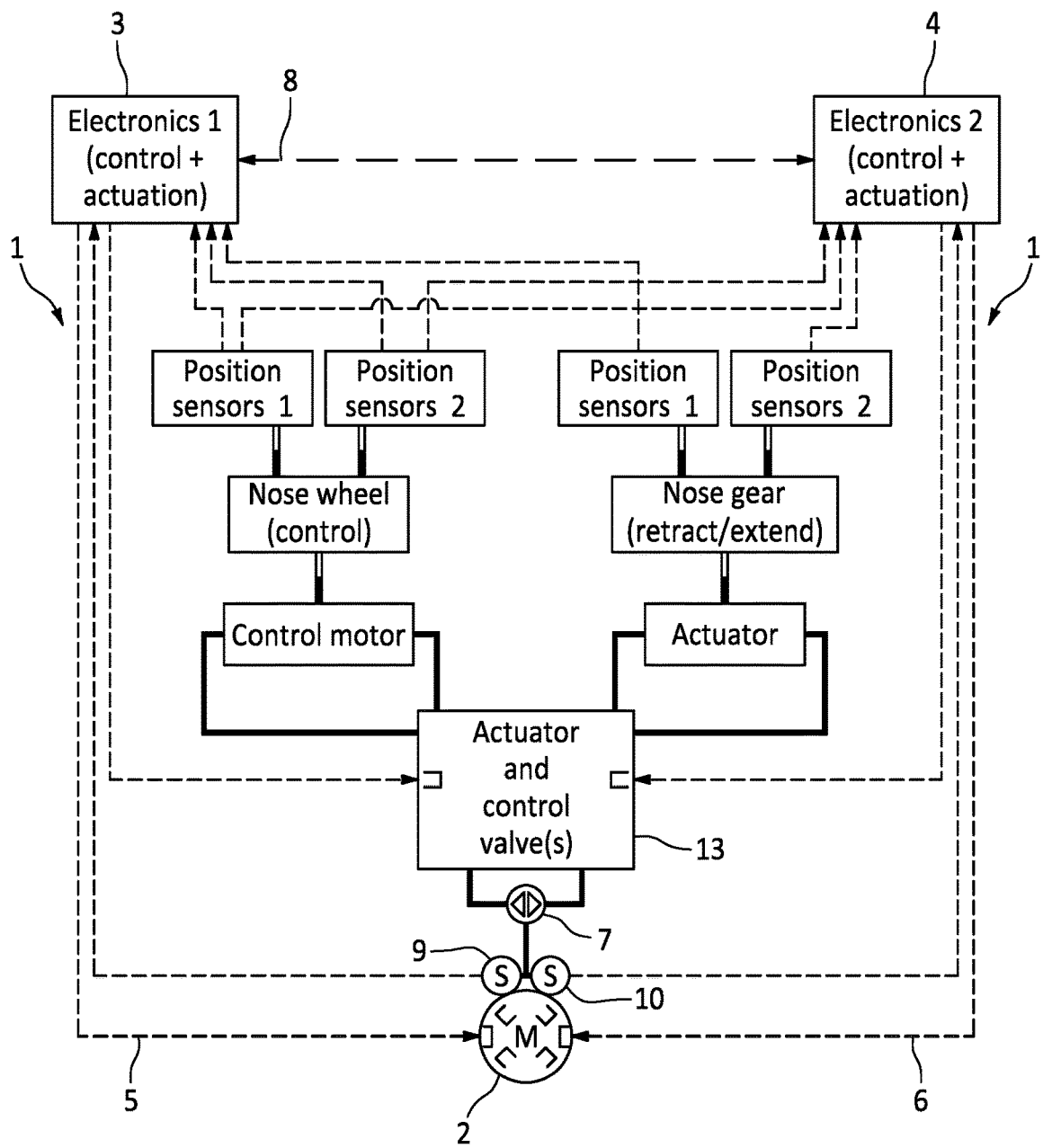
FIG. 5: a schematic representation of an EHA drive for nose wheel control and landing gear actuation in accordance with the invention.

FIG. 5 shows an electrically redundant electrohydraulic drive for a nose wheel control and for a landing gear actuation. It can be seen here that the actuator 1 has a decentralized hydraulic supply that is driven via the electric motor 2 and the associated hydraulic pump 7. The electric motor 2 is here connected to the first drive electronics 3 via a first electric line 5 and to the second drive electronics 4 via a second electric line 6. It can be made out from the representation of the electric motor 2 that it is an electric motor with a dual winding, with the first winding of the dual winding being controllable by the first drive electronics 3 and the second winding of the dual winding being controllable by the second drive electronics 4. A communications link 8 can also be provided between the two drive electronics 3, 4. A first motor sensor 9 and a second motor sensor 10 are furthermore provided that can be of identical designs with respect to one another. The first motor sensor 9 is here connected to the first drive electronics 3, with the second motor sensor 10 being connected to the second drive electronics 4. All the input parameters (motor sensors 9, 10 or position sensors) required for the drive electronics are thereby designed as redundant and result in a small failure probability of the actuator. The total motor control of the electric motor 2 is also of redundant design since the failure of one drive electronic system 3, 4 can be compensated by the other drive electronic system due to the dual winding.

Figure 6:
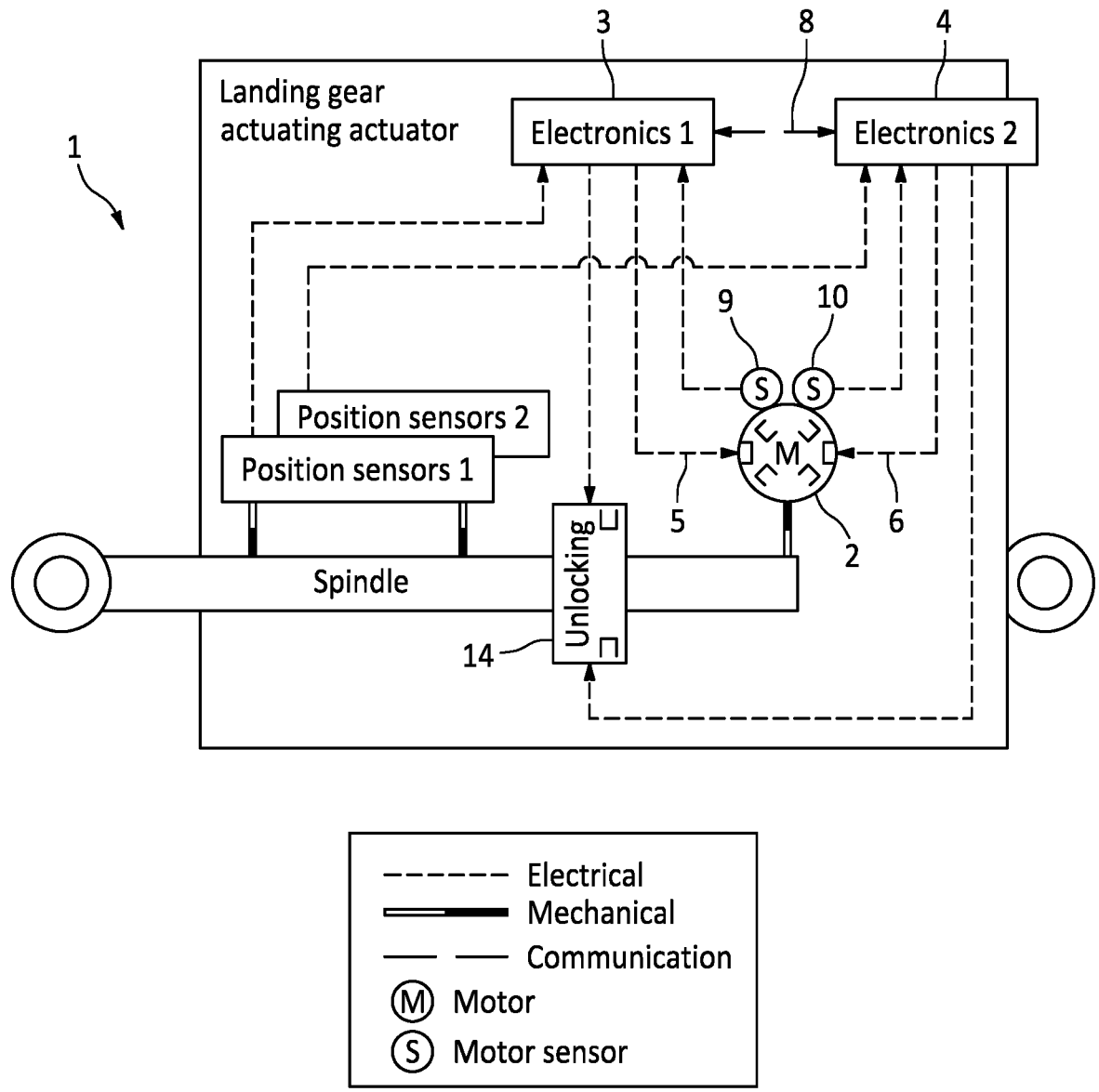
FIG. 6: a schematic representation of an electromechanical actuator for landing gear actuation in accordance with the invention.

FIG. 6 shows an electrically redundantly designed electromechanical actuator for landing gear actuation in which the electronics are integrated in the actuator 1 in a decentralized manner. Due to safety demands, an independent possibility of landing gear extension in emergency operation is typically required by the authorities, which is satisfied by a dual winding motor 2 and the redundant electronics, in particular by the first and second drive electronics 3, 4 and the associated wiring 5, 6. Provision can furthermore be made that the two drive electronics 3, 4 are provided with dissimilar designs. The dissimilarity of the two drive electronics further reduces the failure probability.

The presented examples of the invention can use a 3-phase permanent synchronous motor with a resolver or a Hall effect sensor for the motor regulation. For the redundant control, the windings of the motor and the motor sensors are in a double configuration, whereby the shaft can be extended due to the higher space requirements. Other motor types are not excluded from the invention in this respect.

Provision can also be made that the performance of the redundant drives is realized with the same or reduced performance. Both drive electronics can accordingly be switched to active or, in a normal operation in which both drive electronics are functional, only one of the electronics can be switched to active and the other can be held in a standby mode. The advantage of the active-standby concept is found in the identical actuator response on the failure of a redundancy. Alternatively, in the other concept of the active-active operation, a power drop on the failure in one of the drive electronics is system-inherent. This is, however, required at times since in emergency operation, that is operated on the failure of a drive electronic system of certain actuators, a load of the emergency voltage network should be kept as small as possible.

Provision can additionally be made that the control valves 13 shown in FIG. 5 are implemented in double form and as redundantly controllable (dual coil) valves. The unlocking system 14 shown in FIG. 6 can likewise be required in double form and as a redundantly controllable (dual coil) unlocking device.

The invention claimed is:

1. Actuator in a landing gear system of an aircraft, comprising:
    an electric drive for driving the actuator; and
    first drive electronics for controlling the electric drive directly connected to the drive via an electric lined; and
    second drive electronics for controlling the electric drive directly connected to the drive via an electric line, wherein
    the first drive electronics and the second drive electronics are redundant with respect to one another and independently operate from one another,
    the electric drive is an electric motor that is connected to both the first drive electronics and the second drive electronics,
    the first drive electronics and the second drive electronics are directly connected to one another only via a communications link, and
    the electric motor is a dual winding motor whose windings are electrically independent of one another, with one of the windings cooperating with the first drive electronics and the other winding cooperating with the second drive electronics,
    and further comprising a switchover unit that permits a control of the electric motor by either the first drive electronics or the second drive electronics, the switchover unit being configured to be switched on upon failure of one of the first or second drive electronics, such that the switchover unit disables communication from the failed drive electronics to the electric motor, and failure of one of the first or second drive electronics is compensated by the other of the first or second drive electronics.

2. An actuator in accordance with claim 1, wherein the actuator is an electromechanical actuator or an electrohydraulic actuator; and the electric drive is a pump of a hydraulic circuit with an electrohydraulic actuator.

3. An actuator in accordance with claim 1, wherein the first drive electronics are different from or identical to the second drive electronics.

4. An actuator in accordance with claim 1, wherein the actuator only has the one electric drive and/or the actuator has a decentralized hydraulic circuit.

5. An actuator in accordance with claim 1, wherein the dual winding is present on a common shaft and/or on the same rotor magnets.

6. An actuator in accordance with claim 1, wherein the electric motor has redundantly implemented phases, with one of the redundant phases cooperating with the first drive electronics and the other one of the redundant phases cooperating with the second drive electronics.

7. An actuator in accordance with claim 1, wherein the electric motor is a 3-phase permanent magnetic synchronous motor.

8. An actuator in accordance with claim 1, wherein the actuator is adapted to actuate landing gear or to control a landing gear wheel.

9. An actuator in accordance with claim 1, wherein the performance of the actuator or of the electric drive is independent of the failure of one of the two mutually redundant drive electronics.

10. An actuator in accordance with claim 1, wherein the performance of the actuator or of the electric drive reduces on the failure of one of the two mutually redundant drive electronics.

11. A landing gear system of an aircraft that comprises a plurality of actuators in accordance with claim 1, wherein the first drive electronics and the second drive electronics for the plurality of actuators of the landing gear system are arranged together in a decentralized manner at a location.

12. An actuator in accordance with claim 1, wherein said actuator comprises only a single electric drive, in turn having two separate, redundant drive electronics.

13. An actuator in accordance with claim 12, wherein only the electronics of the actuator are provided as redundant.

14. An actuator in accordance with claim 1, wherein only the electronics of the actuator are provided as redundant.

15. An actuator in accordance with claim 7, wherein the motor is provided with a resolver or with a Hall effect sensor for the motor regulation.

16. An actuator in accordance with claim 10, wherein the failure of one of the two mutually redundant drive electronics is reduced by half.

17. An actuator in a landing gear system of an aircraft, comprising:
    an electric drive for driving the actuator;

first drive electronics for controlling the electric drive directly connected to the drive via an electric line; and second drive electronics for controlling the electric drive directly connected to the drive via an electric line, wherein the first drive electronics and the second drive electronics are redundant with respect to one another and independently operate from one another, the electric drive is an electric motor that is connected to both the first drive electronics and to the second drive electronics, the first drive electronics and the second drive electronics are directly connected to one another only via a communications link, and the electric motor is a dual winding motor whose windings are electrically independent of one another, with one of the windings cooperating with the first drive electronics and the other winding cooperating with the second drive electronics, and further comprising a switchover unit that permits a control of the electric motor by either the first drive electronics or the second drive electronics, the switchover unit being configured to be switched on upon failure of one of the first or second drive electronics, such that the switchover unit disables communication from the failed drive electronics to the electric motor, and failure of one of the first or second drive electronics is compensated by the other of the first or second drive electronics, and a first motor sensor for determining an operating state of the drive and a second motor sensor for determining an operating state of the drive, with the first motor sensor being electrically connected to the first drive electronics and the second motor sensor being electrically connected to the second drive electronics.

* * * * *